(12) United States Patent
Amano et al.

(10) Patent No.: US 9,682,693 B2
(45) Date of Patent: Jun. 20, 2017

(54) HYBRID VEHICLE

(71) Applicant: Toyota Jidosha Kabushiki Kaisha, Toyota-shi, Aichi-ken (JP)

(72) Inventors: Masaya Amano, Toyota (JP); Shinichiro Minegishi, Toyota (JP); Takashi Ando, Nissin (JP); Takeshi Kishimoto, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/041,885

(22) Filed: Feb. 11, 2016

(65) Prior Publication Data
US 2016/0236669 A1 Aug. 18, 2016

(30) Foreign Application Priority Data
Feb. 13, 2015 (JP) ................. 2015-026596

(51) Int. Cl.
*B60W 20/00* (2016.01)
*B60W 10/06* (2006.01)
(Continued)

(52) U.S. Cl.
CPC ........... *B60W 20/10* (2013.01); *B60K 6/26* (2013.01); *B60K 6/365* (2013.01); *B60K 6/445* (2013.01);
(Continued)

(58) Field of Classification Search
CPC ......... B60K 6/26; B60K 6/365; B60K 6/445; B60W 10/06; B60W 10/08; B60W 10/26; B60W 20/10; B60W 2540/10; B60W 2710/0616; B60W 2710/0644; B60Y 2200/92; B60Y 2400/604; B60Y 2400/61; Y10S 903/906; Y10S 903/911; Y10S 903/93
(Continued)

(56) References Cited

U.S. PATENT DOCUMENTS

| 7,688,604 B2* | 3/2010 | Oyobe | .................... B60L 11/18 318/34 |
| 7,935,015 B2* | 5/2011 | Tabata | .................... B60K 6/445 475/5 |

(Continued)

FOREIGN PATENT DOCUMENTS

JP 2013-203116 A 10/2013

*Primary Examiner* — Tyler J Lee
(74) *Attorney, Agent, or Firm* — Dinsmore & Shohl LLP (57) ABSTRACT

A hybrid vehicle includes: an engine; a first motor; a planetary gear having three rotary elements that are connected respectively to a rotary shaft of the first motor, an output shaft of the engine, and a drive shaft coupled to an axle such that on a collinear diagram, the rotary shaft, the output shaft, and the drive shaft are arranged in that order; a second motor; a first inverter configured to drive the first motor; a second inverter configured to drive the second motor; a battery capable of exchanging power with the first and second motors via the first and second inverters; and an electronic control unit configured to control the engine such that a rotation speed of the engine increases at a predetermined time when the engine is operative, respective gates of the first and second inverters are both blocked, and an accelerator is ON.

4 Claims, 7 Drawing Sheets

(51) Int. Cl.
*B60K 6/445* (2007.10)
*B60W 10/26* (2006.01)
*B60K 6/26* (2007.10)
*B60K 6/365* (2007.10)
*B60W 10/08* (2006.01)
*B60W 20/10* (2016.01)

(52) U.S. Cl.
CPC ............ *B60W 10/06* (2013.01); *B60W 10/08* (2013.01); *B60W 10/26* (2013.01); *B60W 2540/10* (2013.01); *B60W 2710/0616* (2013.01); *B60W 2710/0644* (2013.01); *B60Y 2200/92* (2013.01); *B60Y 2400/604* (2013.01); *B60Y 2400/61* (2013.01); *Y02T 10/6239* (2013.01); *Y02T 10/6286* (2013.01); *Y02T 10/7077* (2013.01); *Y10S 903/906* (2013.01); *Y10S 903/911* (2013.01); *Y10S 903/93* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2009/0209382 A1* | 8/2009 | Tabata | ................... | B60K 6/365 475/5 |
| 2009/0224720 A1* | 9/2009 | Oyobe | ................... | B60L 11/18 318/801 |
| 2009/0318261 A1* | 12/2009 | Tabata | ................... | B60K 6/445 477/3 |

* cited by examiner

HYBRID VEHICLE

INCORPORATION BY REFERENCE

The disclosure of Japanese Patent Application No. 2015-026596, filed on Feb. 13, 2015 including the specification, drawings and abstract, is incorporated herein by reference in its entirety.

BACKGROUND

1. Technical Field

The present specification relates to a hybrid vehicle, and more particularly to a hybrid vehicle having an engine, a planetary gear, first and second motors, first and second inverters, and a battery.

2. Description of Related Art

A vehicle having an engine, a power split mechanism (a planetary gear mechanism), first and second motors, first and second inverters, a converter, and a battery has been proposed as a conventional hybrid vehicle of this type (see Japanese Patent Application Publication No. 2013-203116 (JP 2013-203116 A), for example). Here, a rotor of the first motor is connected to a sun gear of the power split mechanism. A crankshaft of the engine is connected to a carrier of the power split mechanism. An output member coupled to an axle is connected to a ring gear of the power split mechanism. A rotor of the second motor is connected to the output member. The converter boosts power on the battery side and supplies the boosted power to the side of the first and second inverters, and steps down power on the side of the first and second inverters and supplies the stepped-down power to the battery side. In this hybrid vehicle, when a fault occurs in the first and second inverters while the engine is operative, respective gates of the first and second inverters are both blocked. A rotation speed of the engine is then controlled in accordance with a direct current side voltage of the inverter, a rotation speed of the output member, and a condition of an accelerator so that a counter-electromotive voltage generated as the first motor rotates exceeds the direct current side voltage of the inverter. In so doing, braking torque derived from the counter-electromotive voltage of the first motor is adjusted, and accordingly, reaction torque (drive torque generated by the output member) to the braking torque is adjusted.

In the hybrid automobile described above, it may be difficult to adjust the rotation speed of the engine in cases where the direct current side voltage of the inverter cannot be detected or the like. It is therefore necessary to enable appropriate travel using a method other than the method described above when a fault occurs in the first and second inverters while the engine is operative.

SUMMARY

The present specification provides a hybrid vehicle that is enabled to travel using a different method to the method described above when the engine is operative and the respective gates of the first and second inverters are both blocked.

A hybrid vehicle according to an aspect of the present specification includes an engine, a first motor that receives and outputs power, a planetary gear having three rotary elements that are connected respectively to a rotary shaft of the first motor, an output shaft of the engine, and a drive shaft coupled to an axle such that on a collinear diagram, the rotary shaft, the output shaft, and the drive shaft are arranged in that order, a second motor that receives and outputs power from and to the drive shaft, a first inverter that drives the first motor, a second inverter that drives the second motor, a battery that exchanges power with the first and second motors via the first and second inverters, and an electronic control unit configured to control the engine such that a rotation speed of the engine increases at a predetermined time when the engine is operative, a signal indicating that respective gates of the first and second inverters are both blocked is received, and an accelerator is ON.

In the hybrid vehicle according to the aspect described above, the first motor, the engine, and the drive shaft are connected to the three rotary elements of the planetary gear such that on a collinear diagram, the rotary shaft of the first motor, the output shaft of the engine, and the drive shaft are arranged in that order. Further, the engine is controlled such that the rotation speed of the engine increases at the predetermined time when the engine is operative, the respective gates of the first and second inverters are both blocked, and the accelerator is ON. When the rotation speed of the engine increases, a rotation speed of the first motor also increases. At this time, torque acts on the rotary element of the planetary gear to which the first motor is connected in a direction for impeding variation in the rotation speed (reducing the rotation speed) of this rotary element (the first motor). This torque is transmitted to the rotary element of the planetary gear to which the drive shaft is connected as torque in a direction for increasing the rotation speed of this rotary element (the drive shaft). As a result, travel (limp-home travel) can be performed using the torque.

In the aspect described above, the electronic control unit may be configured to control the engine at the predetermined time such that the rotation speed of the engine increases and decreases repeatedly, and such that a decrease rate at which the rotation speed of the engine decreases is smaller than an increase rate at which the rotation speed of the engine increases. When the rotation speed of the engine (the rotation speed of the first motor) is increased and reduced, torque is transmitted to the drive shaft in a direction for increasing the rotation speed of the drive shaft and a direction for reducing the rotation speed of the drive shaft, respectively. Therefore, by setting the decrease rate at which the rotation speed of the engine decreases to be smaller than the increase rate at which the rotation speed of the engine increases, a reduction in the rotation speed of the drive shaft (i.e. the vehicle speed) when the rotation speed of the engine decreases can be suppressed more effectively.

In the hybrid vehicle according to the above aspect of the present specification, in which the rotation speed of the engine is increased and reduced repeatedly at the predetermined time, the electronic control unit may be configured to control the engine such that the increase rate is larger when an accelerator depression amount is large than when the accelerator depression amount is small. In so doing, travel can be performed so as to reflect the accelerator depression amount more closely. Here, "such that the increase rate is larger when an accelerator depression amount is large than when the accelerator depression amount is small" may be taken to mean that the increase rate increases steadily as the accelerator depression amount increases.

In the hybrid vehicle according to the above aspect of the present specification, the electronic control unit may be configured to control the engine at the predetermined time such that the rotation speed of the engine is increased to an upper limit rotation speed, and such that the upper limit rotation speed is higher when the accelerator depression amount is large than when the accelerator depression amount is small. In so doing, travel can be performed so as to reflect the accelerator depression amount more closely. Here, "such that the upper limit rotation speed is higher when an accelerator depression amount is large than when the accelerator depression amount is small" may be taken to mean that the upper limit rotation speed increases steadily as the accelerator depression amount increases.

BRIEF DESCRIPTION OF THE DRAWINGS

Features, advantages, and technical and industrial significance of exemplary embodiments of the present specification will be described below with reference to the accompanying drawings, in which like numerals denote like elements, and wherein.

DETAILED DESCRIPTION OF EMBODIMENTS

Next, an embodiment of the present specification will be described using examples.

Figure 1:
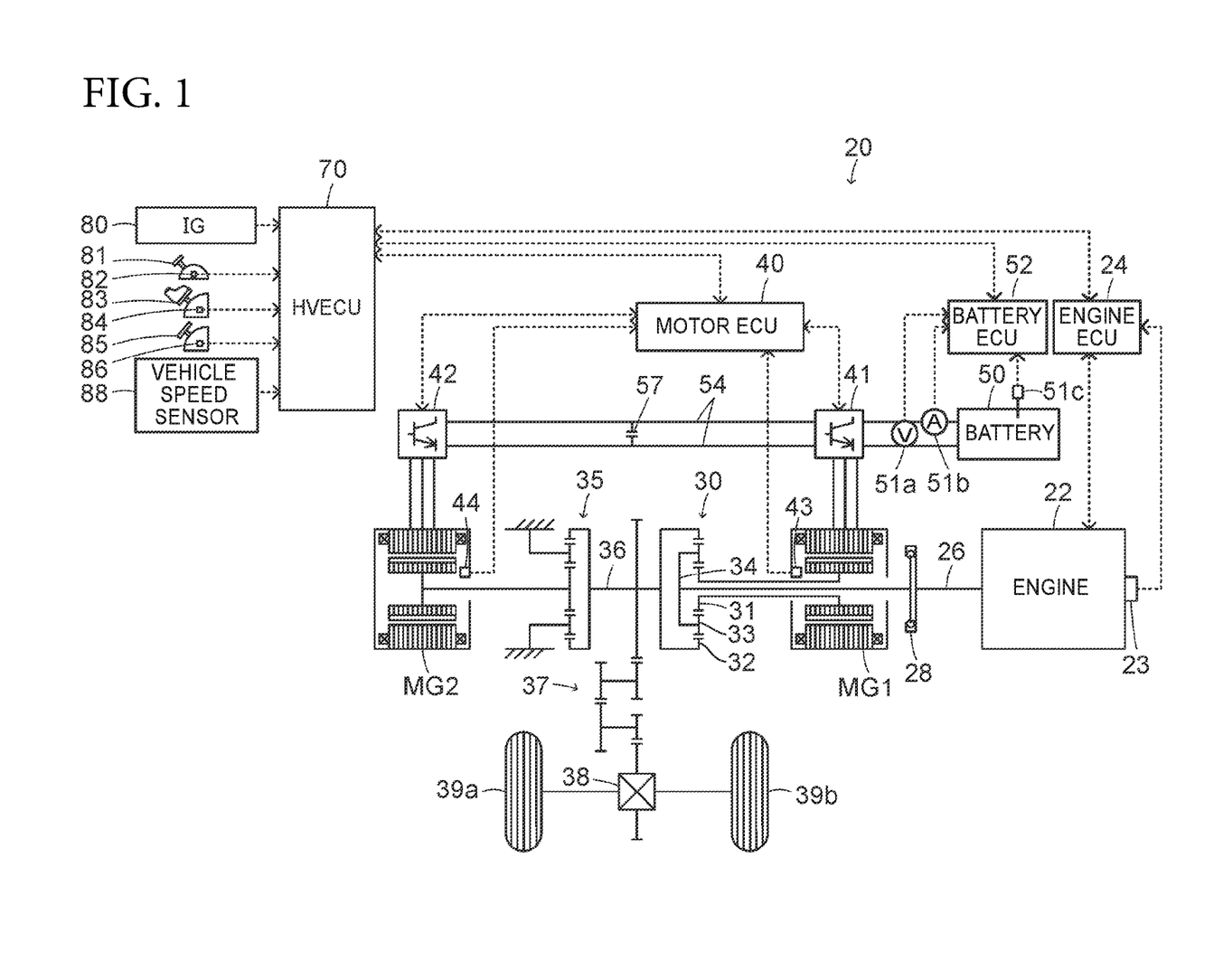
FIG. 1 is a schematic view showing a configuration of a hybrid vehicle 20 serving as an embodiment of the present specification.
Figure 2:
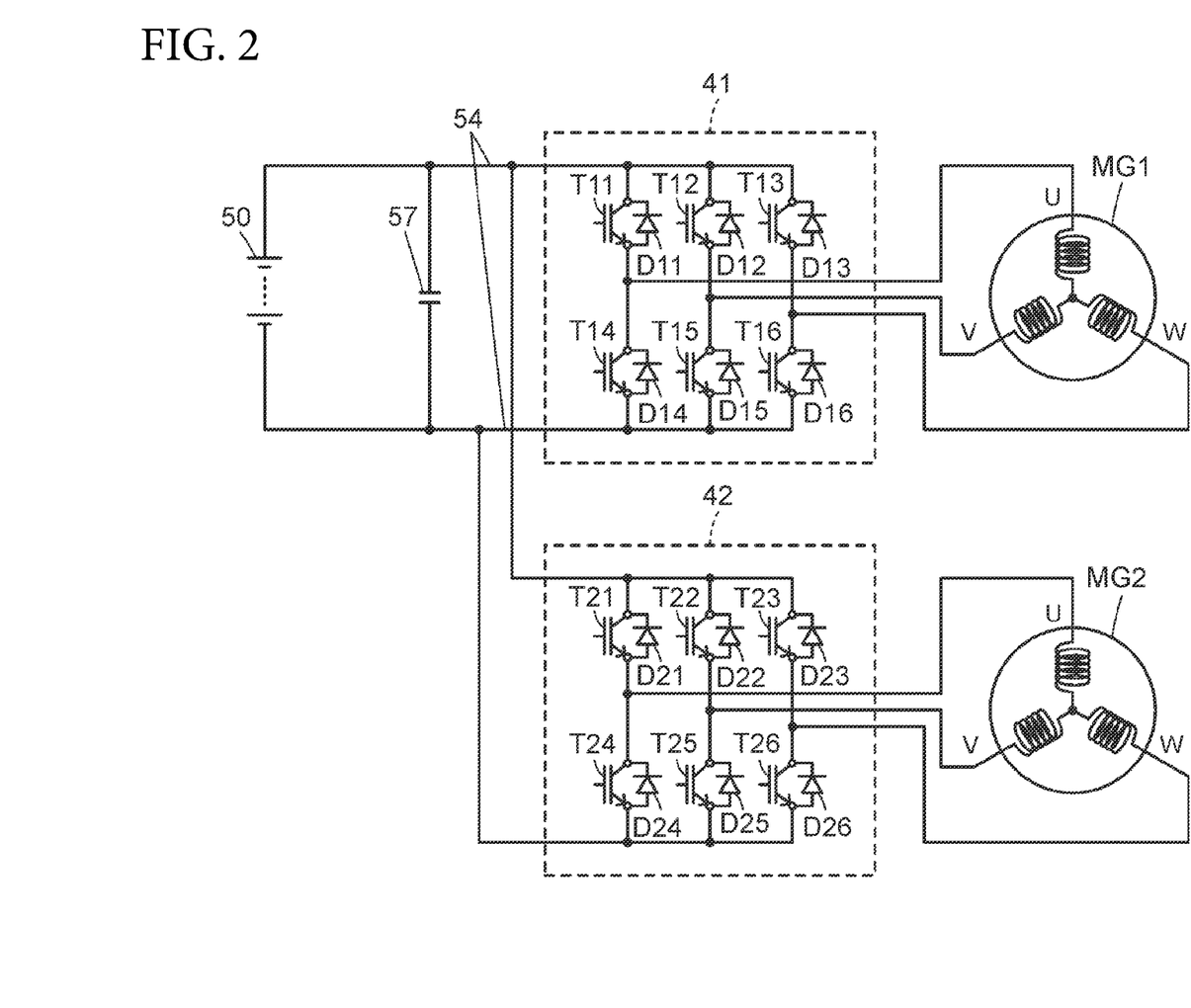
FIG. 2 is a schematic view showing a configuration of an electric driving system including motors MG1, MG2.

FIG. 1 is a schematic view showing a configuration of a hybrid vehicle 20 serving as an embodiment of the present specification. FIG. 2 is a schematic view showing a configuration of an electric driving system including motors MG1, MG2.

As shown in FIG. 1, the hybrid vehicle 20 according to this embodiment includes an engine 22, a planetary gear 30, the motors MG1, MG2, inverters 41, 42, a battery 50, and a hybrid electronic control unit (referred to hereafter as an "HVECU") 70.

The engine 22 is configured as an internal combustion engine that outputs power using gasoline, light oil, or the like as fuel. Operations of the engine 22 are controlled by an engine electronic control unit (referred to hereafter as an "engine ECU") 24.

The engine ECU 24, although not shown in the drawing, is configured as a microprocessor centering on a CPU and including, in addition to the CPU, a ROM that stores a processing program, a RAM that stores data temporarily, input/output ports, and a communication port. Signals from various sensors required to control operations of the engine 22 are input into the engine ECU 24 through the input port. The following may be cited as the signals input from the various sensors: a crank angle θcr from a crank position sensor 23 that detects a rotation position of a crankshaft 26 of the engine 22; and a throttle opening TH from a throttle valve position sensor that detects a position of a throttle valve. Various control signals for controlling operations of the engine 22 are output from the engine ECU 24 via the output port. The following may be cited as the various control signals: a drive control signal output to a throttle motor that adjusts the position of the throttle valve; a drive control signal output to a fuel injection valve; and a drive control signal output to an ignition coil integrated with an igniter. The engine ECU 24 is connected to the HV ECU 70 via the communication port. The engine ECU 24 controls operations of the engine 22 in response to control signals from the HV ECU 70. Further, the engine ECU 24 outputs data relating to operating conditions of the engine 22 to the HV ECU 70 as required. The engine ECU 24 calculates an angular velocity and a rotation speed of the crankshaft 26, or in other words an angular velocity ωne and a rotation speed Ne of the engine 22, on the basis of the crank angle θcr from the crank position sensor 23.

The planetary gear 30 is configured as a single pinion type planetary gear mechanism having a sun gear 31 serving as an external gear, a ring gear 32 serving as an internal gear, a plurality of pinion gears 33 that mesh with the sun gear 31 and the ring gear 32, and a carrier 34 that carries the plurality of pinion gears 33 to be free to rotate and revolve. A rotor of the motor MG1 is connected to the sun gear 31. A drive shaft 36 coupled to drive wheels 39a, 39b via a differential gear 38 and a gear mechanism 37 is connected to the ring gear 32. The crankshaft 26 of the engine 22 is connected to the carrier 34 via a damper 28.

The motor MG1 is configured as a synchronous motor/generator having a rotor in which a permanent magnet is embedded and a stator around which a three-phase coil is wound. As described above, the rotor of the motor MG1 is connected to the sun gear 31 of the planetary gear 30. The motor MG2, similarly to the motor MG1, is configured as a synchronous motor/generator. A rotor of the motor MG2 is connected to the drive shaft 36 via a reduction gear 35.

As shown in FIGS. 1 and 2, the inverters 41, 42 and the battery 50 are connected by a power line 54. A smoothing capacitor 57 is attached to the power line 54.

As shown in FIG. 2, the inverter 41 includes six transistors T11 to T16, and six diodes D11 to D16 connected in parallel to the transistors T11 to T16 in an opposite direction to the transistors T11 to T16. The transistors T11 to T16 are disposed in pairs respectively constituted by a source side transistor and a sink side transistor relative to a positive electrode bus line and a negative electrode bus line of the power line 54. Further, coils (a U phase coil, a V phase coil, and a W phase coil) forming the three-phase coil of the motor MG1 are connected to respective connecting points between the transistor pairs formed by the transistors T11 to T16. Hence, by having a motor electronic control unit (referred to hereafter as a "motor ECU") 40 adjust ON time proportions of the pairs of transistors T11 to T16 while a voltage is applied to the inverter 41, a rotating magnetic field is formed in the three-phase coil, and as a result, the motor MG1 is driven to rotate.

The inverter 42, similarly to the inverter 41, includes six transistors T21 to T26 and six diodes D21 to D26. By having the motor ECU 40 adjust the ON time proportions of the pairs of transistors T21 to T26 while a voltage is applied to the inverter 42, a rotating magnetic field is formed in the three-phase coil, and as a result, the motor MG2 is driven to rotate.

The motor ECU 40, although not shown in the drawings, is constituted by a microprocessor centering on a CPU and including, in addition to the CPU, a ROM that stores a processing program, a RAM that stores data temporarily, input/output ports, and a communication port. As shown in FIG. 1, signals from various sensors required to drive-control the motors MG1, MG2 are input into the motor ECU 40 via the input port. The following may be cited as the signals from the various sensors: rotation positions θm1, θm2 from rotation position detection sensors 43, 44 that detect respective rotation positions of the rotors of the motors MG1, MG2; and phase currents from a current sensor that detects currents flowing through the respective phases of the motors MG1, MG2. Switching control signals for switching the transistors T11 to T16, T21 to T26 of the inverters 41, 42 and so on are output from the motor ECU 40 via the output port. The motor ECU 40 is connected to the HV ECU 70 via the communication port. The motor ECU 40 drive-controls the motors MG1, MG2 in response to control signals from the HV ECU 70. Further, the motor ECU 40 outputs data relating to driving conditions of the motors MG1, MG2 to the HV ECU 70 as required. The motor ECU 40 calculates angular velocities ωm1, ωm2 and rotation speeds Nm1, Nm2 of the motors MG1, MG2 on the basis of the rotation positions ↓m1, θm2 of the rotors of the motors MG1, MG2 from the rotation position detection sensors 43, 44.

The battery 50 is configured as a lithium ion secondary battery or a nickel hydrogen secondary battery, for example. The battery 50 is managed by a battery electronic control unit (referred to hereafter as a "battery ECU") 52.

The battery ECU 52, although not shown in the drawings, is configured as a microprocessor centering on a CPU and including, in addition to the CPU, a ROM that stores a processing program, a RAM that stores data temporarily, input/output ports, and a communication port. Signals required to manage the battery 50 are input into the battery ECU 52 via the input port. The following may be cited as the signals from the various sensors: a battery voltage Vb from a voltage sensor 51a disposed between terminals of the battery 50; a battery current Ib (which takes a positive value during discharge from the battery 50) from a current sensor 51b attached to an output terminal of the battery 50; and a battery temperature Tb from a temperature sensor 51c attached to the battery 50. The battery ECU 52 is connected to the HV ECU 70 via the communication port. The battery ECU 52 outputs data relating to conditions of the battery 50 to the HV ECU 70 as required. The battery ECU 52 calculates a charge/discharge power Pb as a product of the battery voltage Vb from the voltage sensor 51a and the battery current Ib from the current sensor 51b. The battery ECU 52 also calculates a storage ratio SOC on the basis of an integrated value of the battery current Ib from the current sensor 51b. The storage ratio SOC is a ratio of an amount of power that can be discharged from the battery 50 relative to an overall capacity thereof. The battery ECU 52 also calculates input/output limits Win, Wout on the basis of the calculated storage ratio SOC and the battery temperature Tb from the temperature sensor 51c. The input/output limits Win, Wout are maximum allowable amounts of power that can be charged to/discharged from the battery 50.

The HV ECU 70, although not shown in the drawings, is configured as a microprocessor centering on a CPU and including, in addition to the CPU, a ROM that stores a processing program, a RAM that stores data temporarily, input/output ports, and a communication port. Signals from various sensors are input into the HV ECU 70 via the input port. The following may be cited as the signals from the various sensors: an ignition signal from an ignition switch 80; a shift position SP from a shift position sensor 82 that detects an operation position of a shift lever 81; an accelerator depression amount Acc from an accelerator pedal position sensor 84 that detects a depression amount of an accelerator pedal 83; a brake pedal position BP from a brake pedal position sensor 86 that detects a depression amount of a brake pedal 85; and a vehicle speed V from a vehicle speed sensor 88. As described above, the HV ECU 70 is connected to the engine ECU 24, the motor ECU 40, and the battery ECU 52 via the communication port. The HV ECU 70 exchanges various control signals and data with the engine ECU 24, the motor ECU 40, and the battery ECU 52.

The hybrid vehicle 20 according to this embodiment, configured as described above, travels in travel modes such as a hybrid travel mode (an HV travel mode) and an electric travel mode (an EV travel mode). In the HV travel mode, the hybrid vehicle 20 travels in a condition where the engine 22 is operative and the motors MG1, MG2 are driven. In the EV travel mode, the hybrid vehicle 20 travels in a condition where the engine 22 is stopped and the motor MG2 is driven.

In the HV travel mode, the HV ECU 70 first sets a required torque Tr* required for travel (i.e. to be output to the drive shaft 36) on the basis of the accelerator depression amount Acc from the accelerator pedal position sensor 84 and the vehicle speed V from the vehicle speed sensor 88. Next, the HV ECU 70 calculates a travel power Pdrv* required for travel by multiplying a rotation speed Nr of the drive shaft 36 by the set required torque Tr*. Here, a rotation speed obtained by dividing the rotation speed Nm2 of the motor MG2 by a gear ratio Gr of the reduction gear 35, a rotation speed obtained by multiplying the vehicle speed V by a conversion factor, and so on may be used as the rotation speed Nr of the drive shaft 36. The HV ECU 70 then calculates a required power Pe* required by the vehicle by subtracting a charge/discharge required power Pb* of the battery 50 (which takes a positive value during discharge from the battery 50) from the travel power Pdrv*. Next, the HV ECU 70 sets a target rotation speed Ne* and a target torque Te* of the engine 22 and torque commands Tm1*, Tm2* for the motors MG1, MG2 so that the required power Pe* is output from the engine 22 and the required torque Tr* is output to the drive shaft 36 within a range of the input/output limits Win, Wout of the battery 50. The HV ECU 70 then transmits the target rotation speed Ne* and the target torque Te* of the engine 22 to the engine ECU 24, and transmits the torque commands Tm1*, Tm2* for the motors MG1, MG2 to the motor ECU 40. The engine ECU 24, having received the target rotation speed Ne* and the target torque Te* of the engine 22, performs intake air amount control, fuel injection control, ignition control, and the like on the engine 22 so that the engine 22 is operated on the basis of the received target rotation speed Ne* and target torque Te*. Having received the torque commands Tm1*, Tm2* for the motors MG1, MG2, the motor ECU 40 performs switching control on the transistors T11 to T16, T21 to T26 of the inverters 41, 42 so that the motors MG1, MG2 are driven in accordance with the torque commands Tm1*, Tm2*. When a condition for stopping the engine 22 is established during travel in the HV travel mode, for example when the required power Pe* falls to or below a stop threshold Pstop, the engine 22 is stopped and the travel mode is switched to the EV travel mode.

In the EV travel mode, the HV ECU 70 first sets the required torque Tr*, similarly to the HV travel mode. Next, the HV ECU 70 sets the torque command Tm1* for the motor MG1 at a value of zero. The HV ECU 70 then sets the torque command Tm2* for the motor MG2 so that the required torque Tr* is output to the drive shaft 36 within the range of the input/output limits Win, Wout of the battery 50. The HV ECU 70 then transmits the torque commands Tm1*, Tm2* for the motors MG1, MG2 to the motor ECU 40. The motor ECU 40, having received the torque commands Tm1*, Tm2* for the motors MG1, MG2, performs switching control on the transistors T11 to T16, T21 to T26 of the inverters 41, 42 so that the motors MG1, MG2 are driven in accordance with the torque commands Tm1*, Tm2*. When a condition for starting the engine 22 is established in the EV travel mode, for example when the required power Pe*, which is calculated similarly in both the EV travel mode and the HV travel mode, reaches or exceeds a start threshold Pstart, which is larger than the stop threshold Pstop, the engine 22 is started and the travel mode is switched to the HV travel mode.

Figure 3:
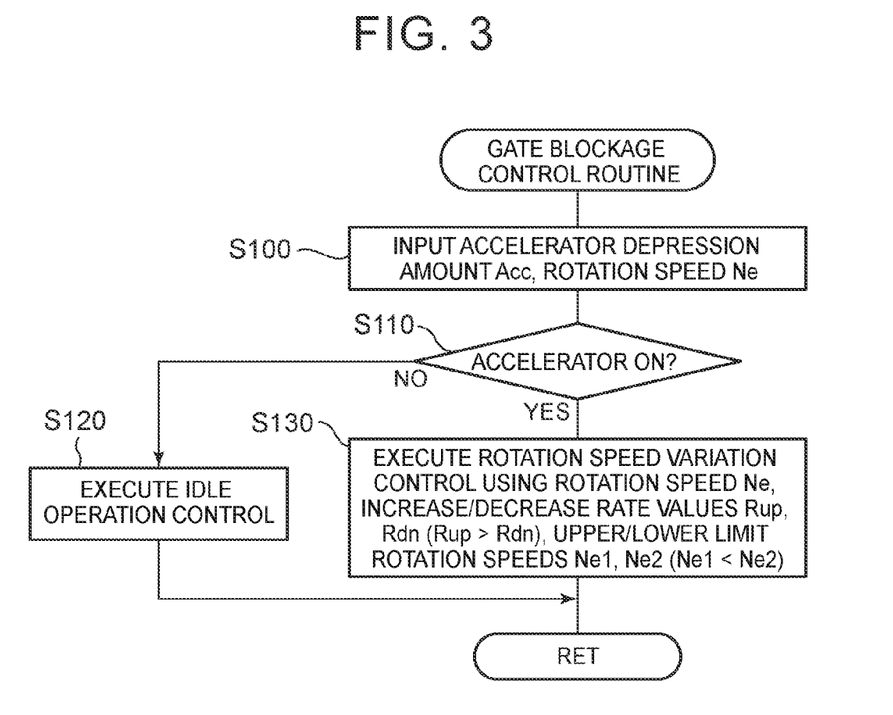
FIG. 3 is a flowchart showing an example of a control routine executed during a gate blockage by an engine ECU 24 according to this embodiment.

Next, an operation of the hybrid vehicle 20 according to this embodiment, configured as described above, and more specifically an operation performed when respective gates of the inverters 41, 42 are both blocked while the engine 22 is operative, will be described. FIG. 3 is a flowchart showing an example of a control routine executed during a gate blockage by the engine ECU 24 according to this embodiment. This routine is executed repeatedly when a signal indicating that the respective gates of the inverters 41, 42 are both blocked is received from the HV ECU 70 while the engine 22 is operative. Note that when an abnormality occurs in both of the inverters 41, 42 such that the respective gates of the inverters 41, 42 are both blocked by the motor ECU 40, a signal indicating the gate blockage is transmitted from the motor ECU 40 to the engine ECU 24 via the HV ECU 70. Further, when the respective gates of the inverters 41, 42 are both blocked due to stoppage of the motor ECU 40 caused by an interruption in a power supply from an auxiliary battery, not shown in the drawings, to the motor ECU 40 or the like, the HV ECU 70 determines that a gate blockage has occurred in the two inverters 41, 42 after being unable to communicate with the motor ECU 40 for a predetermined time, and transmits a signal indicating the gate blockage to the engine ECU 24.

When the gate blockage control routine is executed, first, data such as the accelerator depression amount Acc and the rotation speed Ne of the engine 22 are input into the engine ECU 24 (step S100). It is assumed here that a value detected by the accelerator pedal position sensor 84 is input from the HV ECU 70 as the accelerator depression amount Acc by communication. Further, it is assumed that a value calculated on the basis of the crank angle θcr from the crank position sensor 23 is input as the rotation speed Ne of the engine 22.

Once these data have been input, a determination as to whether the accelerator is ON or OFF is made using the accelerator depression amount Acc (step S110). When it is determined that the accelerator is OFF, idle operation control is executed (step S120), whereupon the current routine is terminated. In the idle operation control, the engine ECU 24 sets the target rotation speed Ne* of the engine 22 at a predetermined rotation speed Nid1 (for example, 1000 rpm, 1200 rpm, or the like), and controls the engine 22 so that the engine 22 performs an idle operation (a no load operation) at the set target rotation speed Ne*.

When it is determined in step S110 that the accelerator is ON, rotation speed variation control is executed using the rotation speed Ne of the engine 22, an increase rate value Rup, a decrease rate value Rdn, a lower limit rotation speed Ne1, and an upper limit rotation speed Ne2 (step S130), whereupon the current routine is terminated. The rotation speed variation control is control for controlling the engine 22 so that the rotation speed Ne of the engine 22 increases and decreases repeatedly. Here, the increase rate value Rup is a rate value employed when the rotation speed Ne of the engine 22 is increased. The decrease rate value Rdn is a rate value employed when the rotation speed Ne of the engine 22 is reduced. In this embodiment, the decrease rate value Rdn is set at a smaller value than the increase rate value Rup. The lower limit rotation speed Ne1 is a lower limit rotation speed employed when the rotation speed Ne of the engine 22 is reduced. The aforementioned predetermined rotation speed Nid1 or the like, for example, may be used as the lower limit rotation speed Ne1. The upper limit rotation speed Ne2 is an upper limit rotation speed employed when the rotation speed Ne of the engine 22 is increased. 2500 rpm, 3000 rpm, 3500 rpm, or the like, for example, may be used as the upper limit rotation speed Ne2.

The rotation speed variation control may be performed by the engine ECU 24 as follows, for example. When the accelerator is switched ON and the rotation speed variation control is started, the target rotation speed Ne* of the engine 22 is set by applying an upper limit guard using a value obtained by adding the increase rate value Rup to a previous target rotation speed (the previous Ne*) of the engine 22 as the upper limit rotation speed Ne2, as shown below in Equation (1), whereupon the engine 22 is controlled such that the rotation speed Ne of the engine 22 reaches the target rotation speed Ne*. By repeating this operation, the rotation speed Ne of the engine 22 is gradually increased to the upper limit rotation speed Ne2. When the rotation speed Ne of the engine 22 reaches or exceeds the upper limit rotation speed Ne2, the target rotation speed Ne* of the engine 22 is set by applying a lower limit guard using a value obtained by subtracting the decrease rate value Rdn from the previous target rotation speed (the previous Ne*) of the engine 22 as the lower limit rotation speed Ne1, as shown below in Equation (2), whereupon the engine 22 is controlled such that the rotation speed Ne of the engine 22 reaches the target rotation speed Ne*. By repeating this operation, the rotation speed Ne of the engine 22 is gradually reduced to the lower limit rotation speed Ne1. When the rotation speed Ne of the engine 22 falls to or below the lower limit rotation speed Ne1, the operation to set the target rotation speed Ne* of the engine 22 is started again using Equation (1), whereby the rotation speed Ne of the engine 22 is gradually increased. By implementing this series of control operations, the rotation speed Ne of the engine 22 is increased to the upper limit rotation speed Ne2 and reduced to the lower limit rotation speed Ne1 repeatedly.

$$Ne^* = \min(\text{previous } Ne^* + Rup, Ne2) \quad (1)$$

$$Ne^* = \max(\text{previous } Ne^* - Rdn, Ne1) \quad (2)$$

Figure 4:
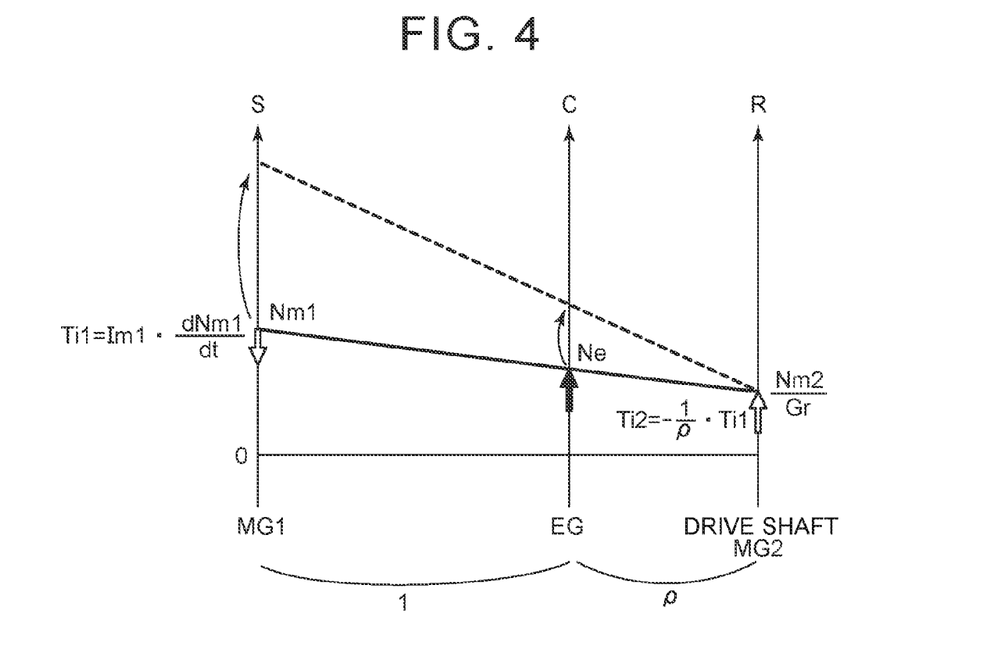
FIG. 4 is an illustrative view illustrating an example of a collinear diagram that shows a relationship between rotation speeds of respective rotary elements of a planetary gear 30 when a rotation speed Ne of an engine 22 is increased during rotation speed increase control.

FIG. 4 is an illustrative view illustrating an example of a collinear diagram that shows a relationship between rotation speeds of the respective rotary elements of the planetary gear 30 when the rotation speed Ne of the engine 22 is increased during the rotation speed increase control. In the drawing, an S axis indicates a rotation speed of the sun gear 31, which corresponds to the rotation speed Nm1 of the motor MG1, a C axis indicates a rotation speed of the carrier 34, which corresponds to the rotation speed Ne of the engine 22, and an R axis indicates a rotation speed of the ring gear 32, which corresponds to a rotation speed (Nm2/Gr) obtained by dividing the rotation speed Nm2 of the motor MG2 by the gear ratio Gr of the reduction gear 35. Further, a thick arrow on the C axis indicates torque output from the engine 22 and applied to the carrier 34 in order to increase the rotation speed Ne of the engine 22. A thick arrow on the S axis indicates torque (torque in a direction for impeding variation in the rotation speed Nm1 of the motor MG1) Ti1 that acts on the sun gear 31 in response to variation in the rotation speed Nm1 of the motor MG1. A thick arrow on the R axis indicates torque Ti2 that acts on the ring gear 32 (the drive shaft 36) via the planetary gear 30 in accordance with the torque Ti1. Here, the torque Ti1 can be determined using an inertia moment Im1 of the motor MG1 and a differential value (dNm1/dt) of the rotation speed Nm1 of the motor MG1 in accordance with Equation (3), shown below. Further, the reaction torque Ti2 can be determined using the torque Ti1 and a gear ratio ρ of the planetary gear 30 (number of teeth of the sun gear 31/number of teeth of the ring gear 32) in accordance with Equation (4). When the rotation speed Ne of the engine 22 (the rotation speed Nm1 of the motor MG1) is increased, the torque Ti1 acts in a direction for reducing the rotation speed of the sun gear 31 while the torque Ti2 acts in a direction for increasing the rotation speed of the ring gear 32 (a rotation speed Nr of the drive shaft 36). Propulsion required for travel can be obtained by transmitting the torque Ti2 from the ring gear 32 to the drive wheels 39a, 39b via the drive shaft 36. As a result, travel (limp-home travel) can be performed when the gates of the inverters 41, 42 are both blocked. Note that when the rotation speed Ne of the engine 22 is reduced, the torque Ti1 acts in a direction for increasing the rotation speed of the sun gear 31 while the torque Ti2 acts in a direction for reducing the rotation speed of the ring gear 32. As a result, travel is impeded by the torque. In this embodiment, as described above, the decrease rate value Rdn is set at a smaller value than the increase rate value. Accordingly, respective magnitudes of the differential value dNm1/dt, the torque Ti1, and the torque Ti2 are smaller when the rotation speed Ne of the engine 22 is reduced than when the rotation speed Ne of the engine 22 is increased. Therefore, in comparison with a case where the decrease rate value Rdn and the increase rate value are set at identical values, a reduction in the rotation speed Nr of the drive shaft 36 (i.e. the vehicle speed V) when the rotation speed Ne of the engine 22 is reduced can be suppressed more effectively.

$$Ti1 = Im1 \times dNm1/dt \quad (3)$$

$$Ti2 = -1/\rho \times Ti1 \quad (4)$$

Figure 5:
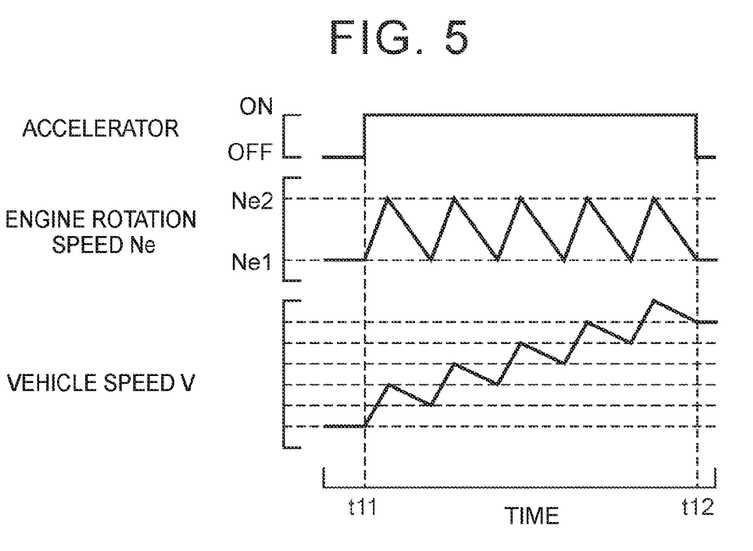
FIG. 5 is an illustrative view illustrating an example of temporal variation in an ON/OFF condition of an accelerator, the rotation speed Ne of the engine 22, and a vehicle speed V when respective gates of inverters 41, 42 are both blocked.

FIG. 5 is an illustrative view illustrating an example of temporal variation in the ON/OFF condition of the accelerator, the rotation speed Ne of the engine 22, and the vehicle speed V when the respective gates of inverters 41, 42 are both blocked. As shown in the drawing, by executing the rotation speed variation control between a point at which the accelerator is switched ON and a point at which the accelerator is switched OFF (from a time t11 to a time t12), the rotation speed Ne of the engine 22 increases from the lower limit rotation speed Ne1 to the upper limit rotation speed Ne2 and decreases from the upper limit rotation speed Ne2 to the lower limit rotation speed Ne1 repeatedly. At this time, a decrease speed at which the rotation speed Ne of the engine 22 decreases is lower than an increase speed at which the rotation speed Ne increases, and therefore the vehicle speed V gradually increases while repeatedly increasing and decreasing. As a result, travel (limp-home travel) can be performed.

In the hybrid vehicle 20 according to the embodiment described above, when the respective gates of the inverters 41, 42 are both blocked and the accelerator is ON while the engine 22 is operative, the engine 22 is controlled such that the rotation speed Ne of the engine 22 increases and decreases repeatedly. In so doing, travel (limp-home travel) can be performed using the torque that acts on the drive shaft 36 via the sun gear 31 and the ring gear 32 of the planetary gear 30 as the rotation speed Ne of the engine 22 (the rotation speed Nm1 of the motor MG1) increases.

Further, in the hybrid vehicle 20 according to this embodiment, the decrease rate value Rdn at which the rotation speed Ne of the engine 22 decreases is set to be smaller than the increase rate value Rup at which the rotation speed Ne of the engine 22 increases. As a result, a reduction in the rotation speed Nr of the drive shaft 36 (i.e. the vehicle speed V) can be suppressed more effectively when the rotation speed Ne of the engine 22 is reduced.

In the hybrid vehicle 20 according to this embodiment, the gate blockage control routine shown in FIG. 3 is executed when the respective gates of the inverters 41, 42 are both blocked while the engine 22 is operative. However, a gate blockage control routine shown in either FIG. 6 or FIG. 7 may be executed in place of the gate blockage control routine shown in FIG. 3. These routines will be described below in sequence.

Figure 6:
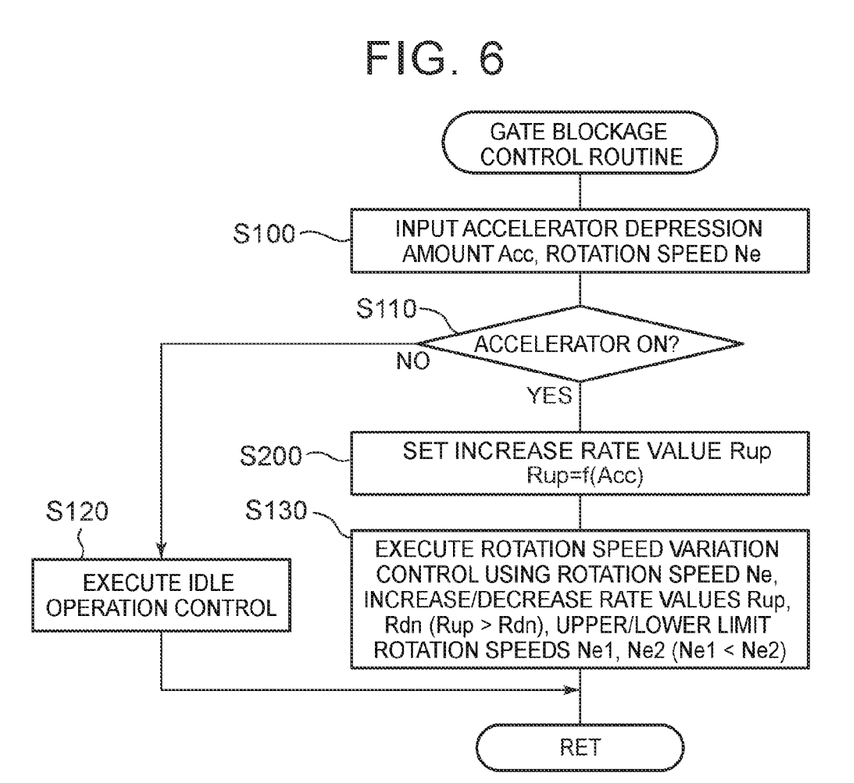
FIG. 6 is a flowchart showing an example of a control routine executed during a gate blockage by the engine ECU 24 according to a modified example.

First, the routine shown in FIG. 6 will be described. The routine shown in FIG. 6 is identical to the routine shown in FIG. 3 except that processing of step S200 has been added to the routine shown in FIG. 3. Accordingly, identical processes to the routine shown in FIG. 3 have been allocated identical step numbers in the routine shown in FIG. 6, and detailed description thereof has been omitted.

In the gate blockage control routine shown in FIG. 6, when the accelerator is ON in step S110, the increase rate value Rup is set on the basis of the accelerator depression amount Acc (step S200). The rotation speed variation control is then executed using the set increase rate value Rup and so on (step S130), whereupon the routine is terminated. Note that in the rotation speed variation control, fixed values are used as the decrease rate value Rdn, the lower limit rotation speed Ne1, and the upper limit rotation speed Ne2 regardless of the accelerator depression amount Acc, similarly to the embodiment.

Figure 8:
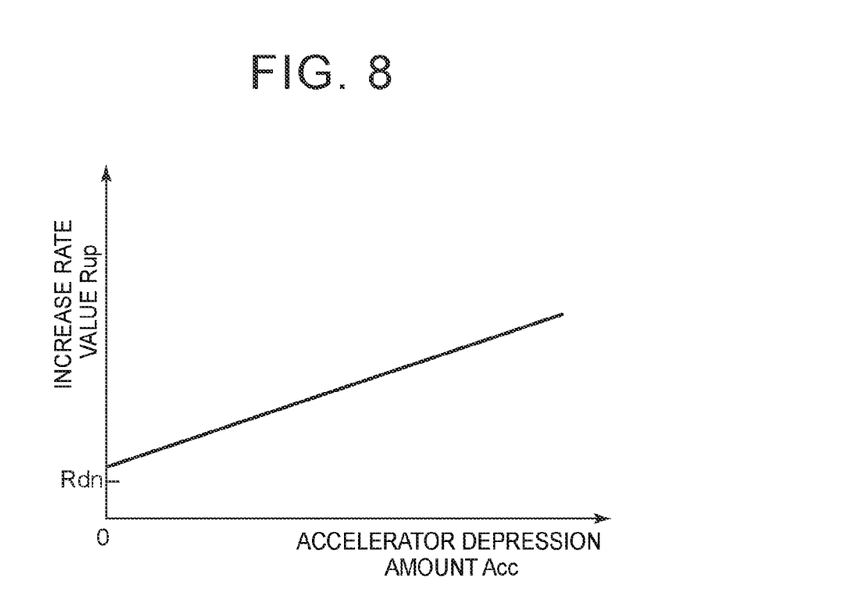
FIG. 8 is an illustrative view illustrating an example of a relationship between an accelerator depression amount Acc and an increase rate value Rup.

In this modified example, the increase rate value Rup is set by determining a relationship between the accelerator depression amount Acc and the increase rate value Rup in advance, storing the determined relationship in the form of a map, and when the accelerator depression amount Acc is given, deriving the corresponding increase rate value Rup from the map. FIG. 8 shows an example of the relationship between the accelerator depression amount Acc and the increase rate value Rup. As shown in the drawing, the increase rate value Rup is set to be larger when the accelerator depression amount Acc is large than when the accelerator depression amount Acc is small, within a range exceeding the decrease rate value Rdn. More specifically, the increase rate value Rup is set on an incline so as to increase steadily as the accelerator depression amount Acc increases within a range exceeding the decrease rate value Rdn. Hence, during the rotation speed variation control, the rotation speed Ne of the engine 22 increases more rapidly when the accelerator depression amount Acc is large than when the accelerator depression amount Acc is small, leading to an increase in the respective magnitudes of the torque Ti1 and Ti2. As a result, the vehicle speed V can be increased to a greater degree when the accelerator depression amount Acc is large than when the accelerator depression amount Acc is small.

Figure 9:
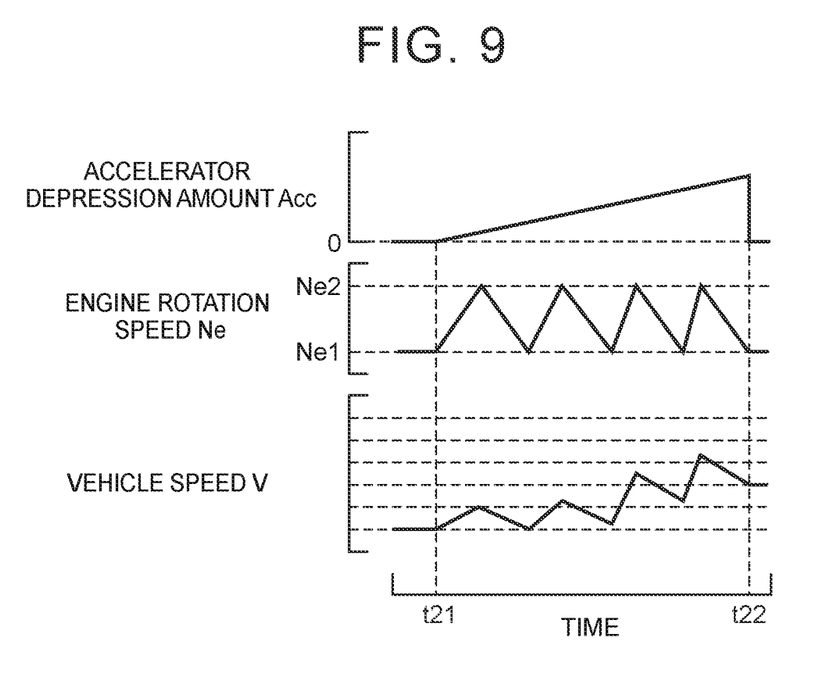
FIG. 9 is an illustrative view illustrating an example of temporal variation in the accelerator depression amount Acc, the rotation speed Ne of the engine 22, and the vehicle speed V when the respective gates of the inverters 41, 42 are both blocked.

FIG. 9 is an illustrative view illustrating an example of temporal variation in the accelerator depression amount Acc, the rotation speed Ne of the engine 22, and the vehicle speed V when the respective gates of the inverters 41, 42 are both blocked, according to this modified example. As shown in the drawing, by executing the rotation speed variation control from the point at which the accelerator is switched ON to the point at which the accelerator is switched OFF (from a time t21 to a time t22), travel (limp-home travel) can be performed in a similar manner to the embodiment. Moreover, when the rotation speed Ne of the engine 22 is increased during the rotation speed variation control, the rotation speed Ne of the engine 22 increases more rapidly when the accelerator depression amount Acc is large than when the accelerator depression amount Acc is small, and therefore the vehicle speed V can be increased in accordance with the accelerator depression amount Acc. In other words, travel (limp-home travel) can be performed so as to reflect the accelerator depression amount Acc more closely.

Figure 7:
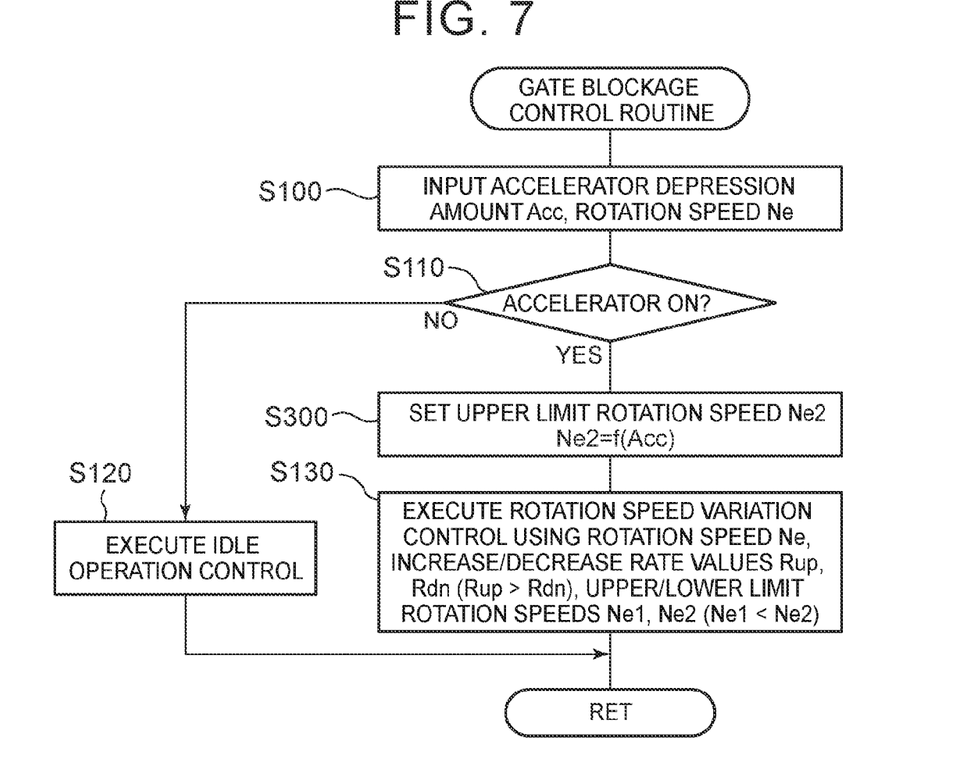
FIG. 7 is a flowchart showing an example of a control routine executed during a gate blockage by the engine ECU 24 according to a modified example.

Next, the gate blockage control routine shown in FIG. 7 will be described. The routine shown in FIG. 7 is identical to the routine shown in FIG. 3 except that processing of step S300 has been added to the routine shown in FIG. 3. Accordingly, identical processes to the routine shown in FIG. 3 have been allocated identical step numbers in the routine shown in FIG. 7, and detailed description thereof has been omitted.

In the gate blockage control routine shown in FIG. 7, when the accelerator is ON in step S110, the upper limit rotation speed Ne2 is set on the basis of the accelerator depression amount Acc (step S300). The rotation speed variation control is then executed using the set upper limit rotation speed Ne2 and so on (step S130), whereupon the routine is terminated. Note that in the rotation speed variation control, fixed values are used as the increase rate value Rup, decrease rate value Rdn, and the lower limit rotation speed Ne1 regardless of the accelerator depression amount Acc, similarly to the embodiment.

Figure 10:
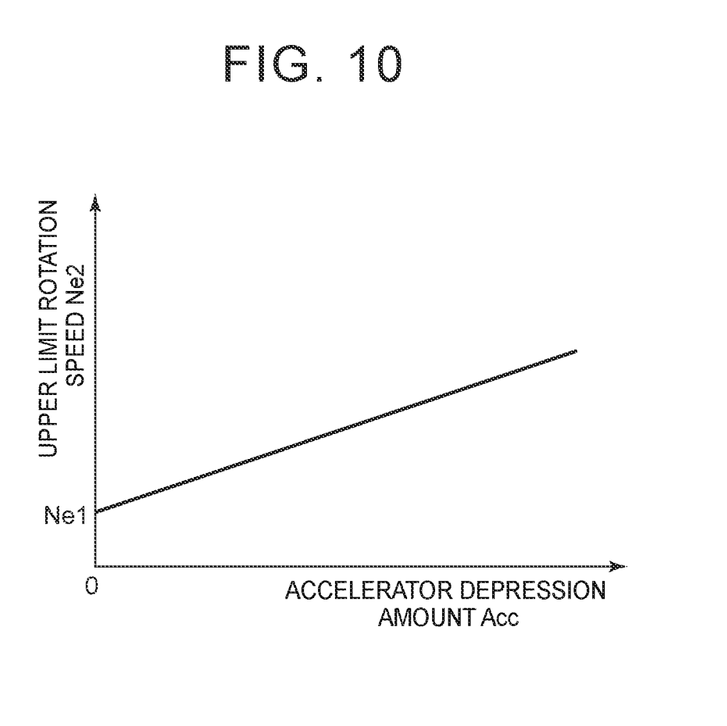
FIG. 10 is an illustrative view illustrating an example of a relationship between the accelerator depression amount Acc and an upper limit rotation speed Ne2.

In this modified example, the upper limit rotation speed Ne2 is set by determining a relationship between the accelerator depression amount Acc and the upper limit rotation speed Ne2 in advance, storing the determined relationship in the form of a map, and when the accelerator depression amount Acc is given, deriving the corresponding upper limit rotation speed Ne2 from the map. FIG. 10 shows an example of the relationship between the accelerator depression amount Acc and the upper limit rotation speed Ne2. As shown in the drawing, the upper limit rotation speed Ne2 is set to be higher when the accelerator depression amount Acc is large than when the accelerator depression amount Acc is small. More specifically, the upper limit rotation speed Ne2 is set on an incline so as to increase steadily as the accelerator depression amount Acc increases. Hence, during the rotation speed variation control, a period in which the rotation speed Ne of the engine 22 increases continuously is longer when the accelerator depression amount Acc is large than when the accelerator depression amount Acc is small, leading to an increase in a period during which the torque Ti2 is applied continuously in the direction for increasing the rotation speed of the ring gear 32. As a result, the vehicle speed V can be increased to a greater degree when the accelerator depression amount Acc is large than when the accelerator depression amount Acc is small.

Figure 11:
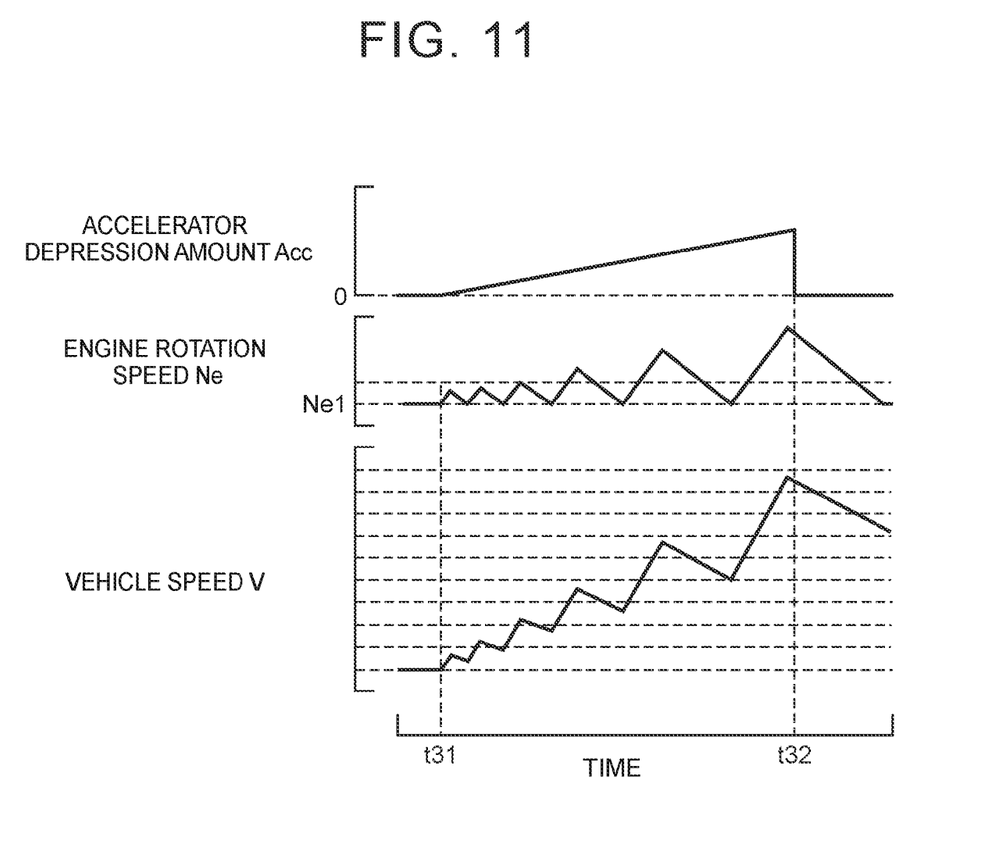
FIG. 11 is an illustrative view illustrating an example of temporal variation in the accelerator depression amount Acc, the rotation speed Ne of the engine 22, and the vehicle speed V when the respective gates of the inverters 41, 42 are both blocked.

FIG. 11 is an illustrative view illustrating an example of temporal variation in the accelerator depression amount Acc, the rotation speed Ne of the engine 22, and the vehicle speed V when the respective gates of the inverters 41, 42 are both blocked, according to this modified example. As shown in the drawing, by executing the rotation speed variation control from the point at which the accelerator is switched ON to the point at which the accelerator is switched OFF (from a time t31 to a time t32), travel (limp-home travel) can be performed in a similar manner to the embodiment. Moreover, when the rotation speed Ne of the engine 22 is increased during the rotation speed variation control, the upper limit rotation speed Ne2 is higher when the accelerator depression amount Acc is large than when the accelerator depression amount Acc is small, and therefore the vehicle speed V can be increased in accordance with the accelerator depression amount Acc. In other words, travel (limp-home travel) can be performed so as to reflect the accelerator depression amount Acc more closely.

In the hybrid vehicle 20 according to the embodiment, the increase rate value Rup and the upper limit rotation speed Ne2 are set at fixed values regardless of the accelerator depression amount Acc. Further, in the routine shown in FIG. 6, the increase rate value Rup is set to take a larger value when the accelerator depression amount Acc is large than when the accelerator depression amount Acc is small, while the upper limit rotation speed Ne2 is set at a fixed value regardless of the accelerator depression amount Acc. Furthermore, in the routine shown in FIG. 7, the upper limit rotation speed Ne2 is set to take a larger value when the accelerator depression amount Acc is large than when the accelerator depression amount Acc is small, while the increase rate value Rup is set at a fixed value regardless of the accelerator depression amount Acc. Alternatively, the increase rate value Rup and the upper limit rotation speed Ne2 may both be set to take larger values when the accelerator depression amount Acc is large than when the accelerator depression amount Acc is small.

In the hybrid vehicle 20 according to this embodiment, the decrease rate value Rdn is set to take a smaller value than the increase rate value Rup. However, the decrease rate value Rdn may be set to take an identical value to the increase rate value Rup.

In the hybrid vehicle 20 according to this embodiment, the engine 22 is controlled such that the rotation speed Ne of the engine 22 increases and decreases repeatedly when the respective gates of the inverters 41, 42 are both blocked and the accelerator is ON while the engine 22 is operative. However, the engine 22 may be controlled such that the rotation speed Ne of the engine 22 is increased only once.

Correspondence relationships between the main elements of the embodiment and the main elements of the present specification will now be described. In the embodiment, the engine 22 corresponds to the "engine", the motor MG1 corresponds to the "first motor", the planetary gear 30 corresponds to the "planetary gear", the motor MG2 corresponds to the "second motor", the inverter 41 corresponds to the "first inverter", the inverter 42 corresponds to the "second inverter", the battery 50 corresponds to the "battery", and the engine ECU 24 that executes the gate blockage control routine shown in FIG. 3 corresponds to the "electronic control unit".

Note that in the correspondence relationships between the main elements of the embodiment and the main elements of the present specification set forth in the section SUMMARY is merely a specific example of an implementation of the present specification set forth in the section SUMMARY, and the elements of the present specification set forth in the section SUMMARY are not limited thereby. In other words, the present specification set forth in the section SUMMARY is to be interpreted on the basis of the description in that section, while the embodiment is merely a specific example of the present specification set forth in the section SUMMARY.

The present specification was described above using embodiment thereof, but the present specification is not limited in any way to this embodiment, and may of course be implemented in various embodiments within a scope that does not depart from the spirit of the present specification.

The invention may be used in the hybrid vehicle manufacturing industry and so on.

What is claimed is:

1. A hybrid vehicle comprising:
   an engine;
   a first motor that receives and outputs power;
   a planetary gear having three rotary elements that are connected respectively to a rotary shaft of the first motor, an output shaft of the engine, and a drive shaft coupled to an axle such that on a collinear diagram, the rotary shaft, the output shaft, and the drive shaft are arranged in that order;
   a second motor that receives and outputs power from and to the drive shaft;
   a first inverter that drives the first motor;
   a second inverter that drives the second motor;
   a battery that exchanges power with the first and second motors via the first and second inverters; and
   an electronic control unit configured to control the engine such that a rotation speed of the engine increases at a predetermined time when the engine is operative, a signal indicating that respective gates of the first and second inverters are both blocked is received, and an accelerator is ON.

2. The hybrid vehicle according to claim 1, wherein the electronic control unit is configured to control the engine at the predetermined time such that the rotation speed of the engine increases and decreases repeatedly, and such that a decrease rate at which the rotation speed of the engine decreases is smaller than an increase rate at which the rotation speed of the engine increases.

3. The hybrid vehicle according to claim 2, wherein the electronic control unit is configured to control the engine such that the increase rate is larger when an accelerator depression amount is large than when the accelerator depression amount is small.

4. The hybrid vehicle according to claim 1, wherein the electronic control unit is configured to control the engine at the predetermined time such that the rotation speed of the engine is increased to an upper limit rotation speed, and such that the upper limit rotation speed is higher when an accelerator depression amount is large than when the accelerator depression amount is small.

* * * * *